(No Model.)  2 Sheets—Sheet 1.

T. W. WELSH.
PACKING.

No. 480,643.  Patented Aug. 9, 1892.

WITNESSES:
T. J. Hogan.
R. H. Whittlesey

INVENTOR,
Thomas W. Welsh,
by J. Snowden Bell,
Att'y.

(No Model.) 2 Sheets—Sheet 2.

T. W. WELSH.
PACKING.

No. 480,643. Patented Aug. 9, 1892.

WITNESSES:
T. J. Hogan.
R. H. Whittlesey

INVENTOR
Thomas W. Welsh,
by J. Snowden Bell
Att'y.

UNITED STATES PATENT OFFICE.

THOMAS W. WELSH, OF WILMERDING, PENNSYLVANIA.

PACKING.

SPECIFICATION forming part of Letters Patent No. 480,643, dated August 9, 1892.

Application filed June 16, 1892. Serial No. 436,948. (No model.)

*To all whom it may concern:*

Be it known that I, THOMAS W. WELSH, a citizen of the United States, residing at Wilmerding, in the county of Allegheny and State of Pennsylvania, have invented or discovered a certain new and useful Improvement in Packing, of which improvement the following is a specification.

The object of my invention is to provide a packing which will insure a tight joint between two surfaces, even when there are slight irregularities in the surfaces which might permit leakage with ordinary forms of packing and which will make a tight joint, even though the packing-gasket may not be of uniform thickness; and it is specially designed to provide a packing by which a joint may be made sufficiently tight to confine fluids under a high pressure without employing such great pressure as is now commonly required to compress the packing.

To this end my invention consists of a packing sheet or gasket formed with a ridge or ridges on one or both sides for packing a joint around a main opening or passage-way and with ridges surrounding or inclosing an opening in the packing ring or gasket through which communicate ports formed in the opposite surfaces, between which the packing is placed.

My improved packing consists of a single sheet, ring, or gasket, which has ridges formed on it only near the edges of the joint to be packed when the joint is a simple one formed by two abutting surfaces which surround a port or opening, or when it is what may be called a "compound joint"—that is, a joint formed by more than two parts.

Figure 1:
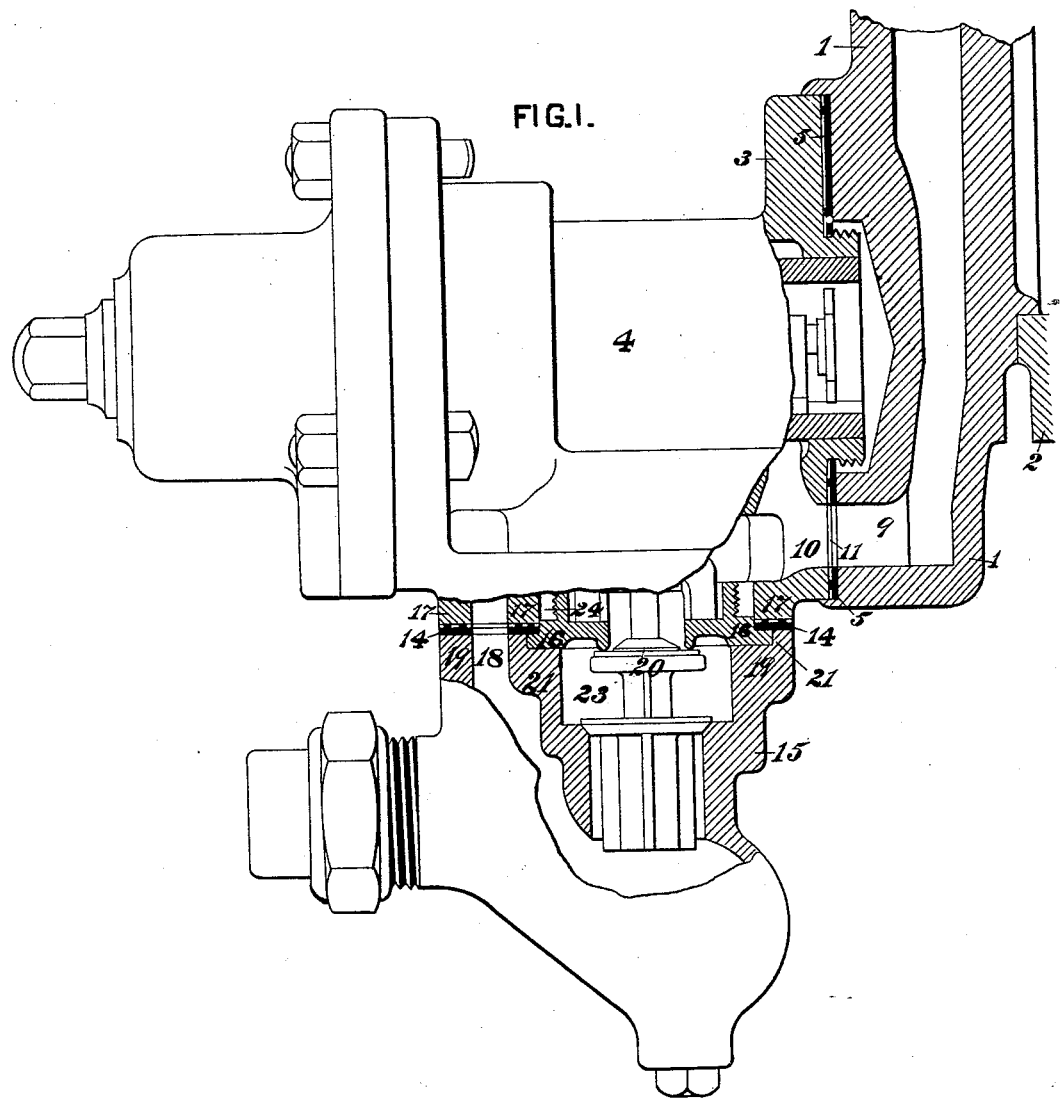
Figure 2:
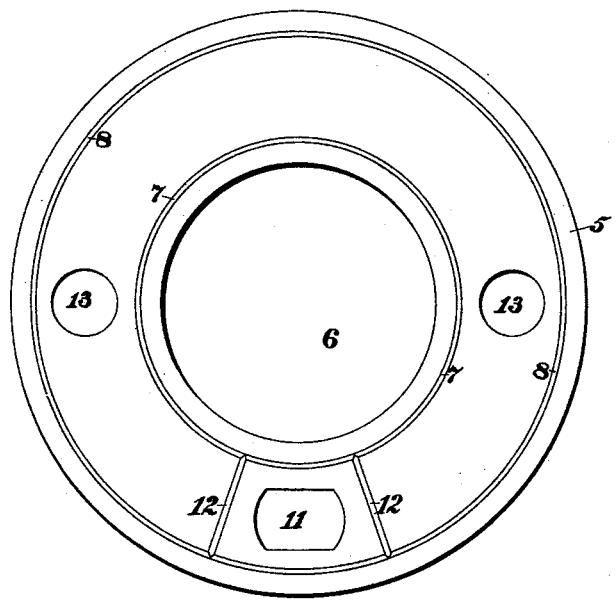
Figure 5:
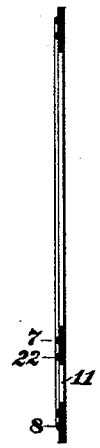
Figure 3:
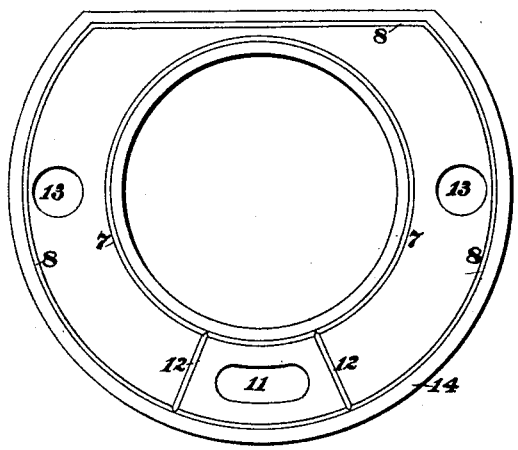
Figure 4:
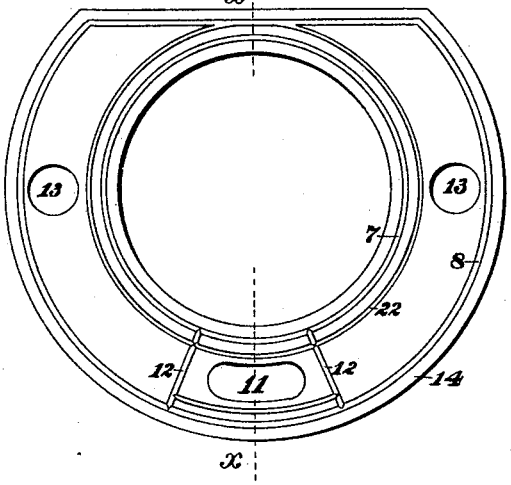

In the accompanying drawings, which illustrate an application of my invention, Figure 1 is a view, partly in elevation and partly in section, of a triple valve such as forms part of automatic fluid-pressure brake systems, showing it attached to a break-cylinder head, the joint between the triple valve and the brake-cylinder head and the joint between the triple-valve body and the drain-cup of the triple valve being shown in section. Figs. 2, 3, and 4 are views, in elevation and on an enlarged scale, of packing-gaskets embodying my invention, and Fig. 5 a transverse section at the line $x\,x$ of Fig. 4.

In Fig. 1 of the drawings two joints are shown with my improved packing. In the one between the head 1 of the brake-cylinder 2 and the flange 3, formed on the end of the triple valve 4, the gasket 5 fits between the surface on the cylinder-head and the surface on the flange 3 of the triple valve and has an opening 6 formed in it. (See Fig. 2.) Surrounding this opening and concentric therewith, or approximately so, two ridges 7 and 8 are formed on the gasket—one near its inner edge and the other near its outer edge. The inner ridge 7 serves to make a tight joint around the opening 6, and the outer ridge 8, with the ridge 7, serves to preserve the proper balance between the surfaces and prevents tilting of the parts. By this arrangement the material to be compressed, in order to make a tight joint, is reduced to a minimum, and a tight joint is formed with comparatively little pressure and without the necessity of compressing material which is not only superfluous in making the joint, but which often prevents the making of a tight joint.

My improved packing is preferably formed with the two ridges only, thus forming a bearing for the inner and outer edges of the flanges or surfaces between which it is placed.

As shown in Fig. 1, a port 9 is formed in the cylinder-head 1 and registers with a port 10 in the triple valve, and in order that these ports may communicate with each other when the packing is in place a port or opening 11 is made through the gasket, and this opening is inclosed or surrounded by portions of the ridges 7 and 8 on two sides and by two radial or cross-ridges 12 on the other sides. These ridges 12 extend across from one to the other of the ridges 7 and 8, and their particular form and direction will of course depend on the shape of the port around which they are placed. By this means fluid under pressure passing between the ports 9 and 10 is confined by the inclosing ridges which surround the opening 11 and prevent leakage into the annular space between the ridges 7 and 8.

It will be seen that a tight joint can be made with my improved packing with very much less pressure than would be required if the gasket were plane or of uniform thickness throughout, or if the whole surface were covered with numerous ridges between the inner and outer edges, because these constructions, from which my improvement wholly differs, include parts which offer great resistance to compression on account of the greater amount of material to be compressed, and in case of certain parts being harder than others they may altogether prevent contact at points where it is necessary to form a joint.

With other forms of packing it is necessary to screw up the nuts or bolts with so much force, in order to make a tight joint, that it is often difficult to break the joint again quickly with ordinary tools; and this is particuly objectionable in devices employed on railway-trains, where it is often necessary to quickly break and make a joint on the road with only the simplest appliances at hand.

The ridges 12 between the ridges 7 and 8, which complete the inclosure of the opening 11, serve to make a tight joint around the ports 9 and 10 and prevent leakage into the annular space between the ridges 7 and 8 and out through the bolt-holes 13, and also serve to make a tight joint around the ports, which prevents leakage in case of breaks in the ridges 7 and 8 at other parts of the gasket or in case the proper contact is not made between the surfaces and the ridges at other portions of the gasket.

In Figs. 3 and 4 the gasket 14 is shown in the form employed to make the joint between the under part of the triple-valve body and the drain-cup 15, which incloses the quick-acting valve mechanism. In Fig. 3 the gasket is substantially of the same form as that shown in Fig. 2, except that the outer edge, instead of being circular in shape, is straight on one side to conform to the shape of the casting at the joint, and a portion of the outer ridge 8 is made straight and parallel with the outer edge of the gasket.

The form shown in Fig. 3 may be used in case the part 16 is made integral with the body of the triple valve or with that portion of the drain-cup at which the joint is made—that is, the form shown in Fig. 3 may be employed when a single joint or a joint between two parts only—such as that shown between the triple valve and the brake-cylinder head—is to be made tight; but when, as shown in Fig. 1, more than two parts come together to form what I have termed for convenience a "compound joint" I prefer to employ the form shown in Fig. 4, in which each port or opening is inclosed by ridges which form a tight joint around it and shut it off from every other port or opening and in which the joints between two parts which have no packing between them are prevented from leaking by the peculiar construction and arrangement of the packing. This will be clearly understood by reference to Figs. 1 and 4.

In Fig. 1 the part 17 of the triple valve, the part 19 of the drain-cup, and the part 16, in which the seat of the valve 20 is formed, come together to form a compound joint. The gasket 14 is placed between the parts 16 and 19 on one side and the part 17 on the other side; but no packing is employed in the joint 21 between the parts 16 and 19, and in order to prevent leakage through this joint into the space in which the bolt-holes 13 are formed or from the quick-acting valve-chamber 23 into the passage or port 18 or from either the chamber 23 or the port 18 into the chamber 24 the ridges 7 and 22 are so formed on the gasket that when the gasket is in place the joint 21 comes between them. In this way the joint 21 is made to open into an annular space between the two ridges, which form tight joints, inclosing the space. In the drawings the ridges are shown on the opposite side of the gasket from the joint 21; but they may be formed on either or both sides. When the gasket is formed, as shown, and placed with the flat side toward the joint 21, any escaping fluid must first lift the flat portion before entering the annular space between the ridges, and it is there confined by the joint formed by the compression of the ridges.

My packing is intended for use in making joints to prevent leakage of fluid-pressure from within or without, and whether the fluid-pressure employed is above or below the atmospheric pressure, and while other material may be used, I prefer to use soft rubber or other similar elastic material.

Packing rings or gaskets made in accordance with my improvement, as above described, constitute a compact, light, and inexpensive packing, which may be made so as to be applicable to a great variety of joints besides those mentioned and in various sizes, so as to be placed upon the market as a standard article of manufacture available for general use.

I claim as my invention and desire to secure by Letters Patent—

1. A sheet, ring, or gasket of compressible or elastic packing material, having inner and outer ridges formed on its surface near the edges, a flat surface between the ridges, an opening or port through said flat part of the gasket, and inclosing ridges between the inner and outer ridges, which, with portions of the inner and outer ridges, form a complete inclosure for the port and prevent leakage from it to the space between the inner and outer ridges or to the atmosphere, substantially as set forth.

2. A ring, sheet, or gasket of compressible or elastic packing material for packing a compound joint consisting of at least two joints which open one into the other, said packing being adapted to be placed in the main joint or between the surfaces which form the main joint and having a ridge formed on it near its outer edge and two ridges formed on it adjacent to its inner edge, which inclose between them the other joint or joints, substantially as set forth.

In testimony whereof I have hereunto set my hand.

THOMAS W. WELSH.

Witnesses:
L. E. LOVE,
T. J. HOGAN.